Jan. 6, 1942.  T. B. CHACE  2,268,565
METHOD OF MAKING COMPOSITE BEARING METAL AND PRODUCTS THEREOF
Filed Jan. 5, 1939
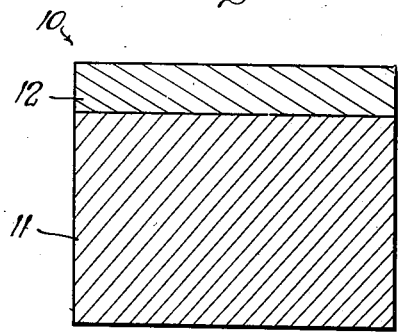
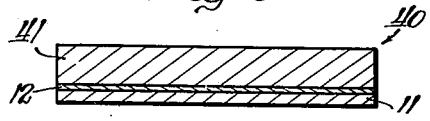
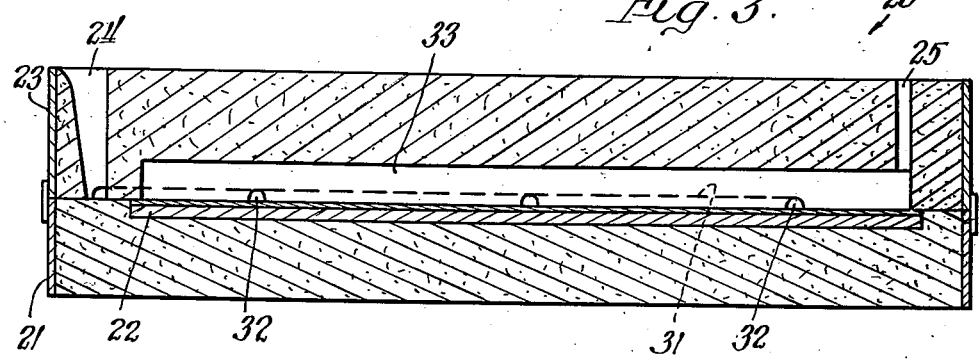
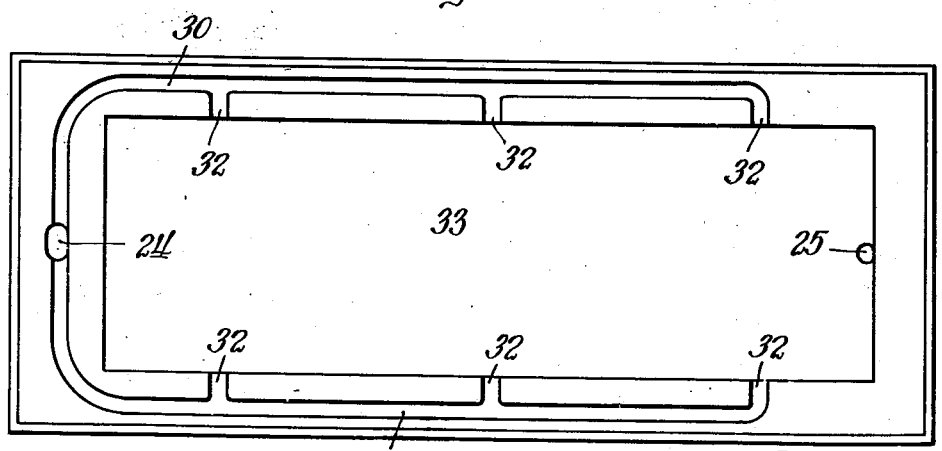
Inventor:
Thomas B. Chace.
By Brown Jackson Boettcher Dienner
Attys Patented Jan. 6, 1942

2,268,565

UNITED STATES PATENT OFFICE 2,268,565

METHOD OF MAKING COMPOSITE BEARING METAL AND PRODUCTS THEREOF

Thomas B. Chace, Winnetka, Ill., assignor to Clad Metals Industries, Inc., Chicago, Ill., a corporation of Illinois Application January 5, 1939, Serial No. 249,354

3 Claims. (Cl. 29—149.5)

My invention relates generally to composite bearing metal, and it has particular relation to composite bearing metal comprising a layer of support metal, an intermediate layer of bonding metal integrally bonded to the support metal, and a layer of bearing metal cast on the layer of bonding metal. In general, the support layer is of low carbon steel, the intermediate bonding layer is of copper or a copper alloy, and the layer of bearing metal comprises a plastic bronze. However, my invention is not limited to these metals.

A good bearing metal must stand up under steady and suddenly applied loads, have a certain degree of plasticity, low coefficient of friction, and a low rate of wear. As this combination of properties is not generally obtainable with one solid homogeneous alloy, bimetal bearings have been resorted to. These bimetal bearings comprise generally a steel support layer and a layer of bearing metal bonded thereto. The advantage of using a soft metal lining in a harder shell is that the load carrying capacity may be increased without sacrificing plasticity which permits the bearing surface to adjust itself to the contour of a shaft even with a slight lack of alignment.

It is old to bond bearing bronzes, such as copper lead alloys, directly to steel by preheating the steel and casting bronze thereon to form steel backed bronze bearings or bushings. To perfect a bond between copper or its alloys (cupreous metal) with steel, it is necessary to create a temperature at the meeting spaces in excess of the melting temperature of the cupreous metal, usually in the neighborhood of 2000 or 2100 degrees F. This temperature will vary with the particular alloys or metals involved and is somewhat dependent on the method used and the size of the units to be bonded. In any event, direct bonding of cupreous metals to steel necessitates preheating or heating of the steel either prior to casting the bearing alloy on it or by casting sufficient bearing alloy to bring the steel to about the melting point of the alloy. The longer the bearing metal is maintained in molten state in contact with the steel, the lower the temperature can be used to secure a bond. If the bearing metal is cast at extremely high temperatures, the steel can be preheated to a correspondingly low temperature, or if the steel is heated to an extremely high temperature, the bearing metal can be cast at a lower temperature. This necessarily high temperature at the meeting faces to form a bond is very objectionable. Iron from the steel backing diffuses rapidly throughout the bearing metal before solidification, which later causes hard spots in the bearing surface and decreases its wear and corrosion resistance.

It is interesting to find from numerous tests and analyses that the dissolving of iron is much more rapid during the first few seconds of contact with the molten bearing metal, and that although dissolving continues during the period in which the bearing metal is molten, it is at a much slower rate than at first. For example, with the fastest possible solidification of a copper lead bearing alloy after casting on a steel backing, the iron pick up may be 0.5%, and if maintained molten for as long as ten minutes it would only increase to about 1.5% iron. It is of further interest to find that iron concentration appears to be greater at the outer surface of the bearing metal and less at the bond or interface. Even 0.3% iron in the bearing metal has been found to be objectionable.

The high temperatures required to form a satisfactory bond between the bearing metal and steel backing are further objectionable when the bearing metal is susceptible of segregation. This is particularly true with copper lead bearing metal since copper and lead are immiscible in the molten state unless considerably above their melting temperatures. To prevent segregation, these bronzes must be cast at rather high temperatures and in a chilled mold. Increase in casting temperature has much less effect on segregation than increase in mold temperature. The necessity of preheating the steel to secure a satisfactory bond when the bearing metal is bonded directly thereto involves the problem of asembling with the steel backing a mold for casting the bearing metal while the steel is still hot during a very short interval. It is therefore obvious that when bearing metal is cast directly on the steel backing, the product is not entirely satisfactory since preheating of the steel to a temperature to secure a satisfactory bond dissolves iron throughout the bearing metal and since it is very difficult to secure fast enough solidification of the molten bearing metal to prevent segregation thereof.

An important object of my invention is to prevent iron migration when molten bearing metal is cast on a steel backing support.

Another object of my invention is to prevent segregation of a molten bearing metal when it is cast on a steel backing support.

Another object of my invention is to bond an upper layer of bearing metal to a steel backing member without preheating the backing member.

Another object of my invention is to permit the use of convention foundry equipment and practice for producing composite bearing metal.

Another object of my invention is to take advantage of the wrought structure produced when a relatively thick layer of cupreous bonding metal is rolled and reduced, to prevent iron migration therethrough.

Other objects of my invention will in part be obvious and, in part, appear hereinafter.

Generally speaking, my invention is directed to a method of making steel-backed bronze bearings or bushing material by bonding a bearing bronze to a copper clad steel backing member. The copper clad steel backing member is in the form of a wrought sheet or strip having been rolled from slab form. The steel may be of any desired analyses, but it is generally a low carbon steel of about 0.1% carbon. The copper facing which, in the finished bearing metal, is an intermediate layer, may be copper or a copper alloy and will be referred to hereinafter as cupreous metal. It may contain small quantities of silicon, zinc, or manganese to better its casting or rolling properties, and it may contain nickel to increase its melting temperature. Generally, it should have a melting temperature above that of the bearing bronze to be cast to it as the outer facing. The proportions of cupreous metal thickness to the steel thickness in the composite backing metal may be of any desired percentage, but usually five to twenty per cent cupreous metal of the total thickness of the composite slab will suffice.

The composite backing member is preferably formed by bonding a layer of cupreous metal to a relatively thick steel backing slab which may be subsequently rolled into composite metal sheet or strip. Methods of forming such composite metal strip are disclosed in my copending applications Serial No. 6,497, filed February 14, 1935, issued as Patent No. 2,145,248, on January 31, 1939; Serial No. 64,280, filed February 17, 1936, issued as Patent No. 2,193,246, on March 12, 1940; Serial No. 118,812, filed January 2, 1937, issued as Patent No. 2,190,310, on February 13, 1940; Serial No. 106,869, filed October 21, 1936, issued as Patent No. 2,174,733, on October 3, 1939; Serial No. 119,404, filed January 7, 1937; and Serial No. 158,656, filed August 12, 1938. For instance, the composite backing metal may be .060 inch thick comprising .009 inch of copper and .051 inch of steel. If the composite backing member is thicker than .06 of an inch, the cupreous metal layer may remain substantially the same as I have found that .01 inch of cupreous metal is ample for the purpose. Such composite backing member may be rolled from a composite slab of about five inches in thickness and comprising .75 of an inch of cupreous metal and 4.25 inches of steel.

It has been found that when such a relatively thick composite metal slab is rolled into sheet or strip form, the cupreous metal layer is given a wrought structure. The wrought structure of the cupreous metal layer gives it peculiarly excellent properties for preventing iron migration therethrough which cannot be obtained in a similar layer of cupreous metal which is obtained by electroplating or by dipping in a molten bath of the cupreous metal.

The bearing metal may be any metal suitable for this type of service, such as leaded copper alloys, and may contain up to 30% lead and other elements, such as tin or small quantities of zinc, in some cases. Sulphur diminishes the temperature range through which molten lead and copper are immiscible and may be added in small quantities. The high lead bronzes, such as 20 to 30 per cent lead, are improved in respect to lead segregation by adding thereto up to 1% nickel. Impurities should be held to a maximum of 1%, including not over .25% iron. In those instances where accurate fit and adjustment can be maintained, it is permissible to use lead free bronzes, such as phosphorous bronze. These alloys usually have lower melting points than copper, which melts at about 1990° F., and can be cast from considerably above their melting points directly onto the cupreous metal facing of the composite backing member without melting through the cupreous facing to the steel interface.

The molten bearing metals will bond readily to the cupreous metal facing of the composite backing member, and preheating thereof will not be required. If the bearing metal has a sufficiently high melting point and has to be cast at a temperature which would possibly melt through the cupreous metal facing of the composite backing member, the melting point of the cupreous metal may be raised by using a copper-nickel alloy.

For a more complete understanding of the nature and scope of my invention, reference may now be had to the following detailed description, taken in conjunction with the accompanying drawing, in which:

Figure 1 is a sectional view of a relatively thick composite metal slab formed by such methods as are disclosed in my above mentioned copending applications;

Figure 2 is a sectional view of the composite sheet formed on rolling the composite slab of Figure 1;

Figure 3 is a cross-sectional view of a conventional small foundry mold prepared with an insert of composite metal strip adapted to have a layer of bearing metal cast thereon;

Figure 4 is a bottom plan view of the top section of the mold of Figure 3, lifted off of the lower section; and Figure 5 is a sectional view of a three-layer composite bearing metal body illustrating my invention.

In Figure 1 of the drawing, the reference character 10 designates generally a composite metal slab comprising a steel backing 11 and a layer of cupreous metal 12 bonded thereto. The composite metal slab 10 may be produced by any of the several methods disclosed in my above mentioned copending applications. The character of the bond between the cupreous facing metal 12 and the steel backing 11 is of such strength as to allow the composite metal slab 10 to be rolled and reduced by rolling mill practice to sheet or strip form. In Figure 2 of the drawing, a section of a sheet or strip that may be produced by rolling the composite metal slab 10 is shown generally at 13. Such a method of producing the composite strip 13 imparts certain desirable characteristics thereto. When the composite metal slab 10 is formed, the molten cupreous metal 12 is maintained on the cleaned surface of the steel slab 11 for sufficient time to allow the cupreous facing metal 12 to form an integral bond therewith. Due to the comparatively great bodies of metal involved, it is feasible to allow a longer soaking period than is otherwise possible where thin layers of facing metal 12 are cast on correspondingly thin steel backing layers 11. When the composite metal slab 10 is rolled and reduced to composite metal sheet 13, the cupreous facing metal 12 is given a dense wrought structure. Such a structure cannot be obtained by electrolytically depositing a thin layer of cupreous facing metal 12 onto a steel backing strip 11, or by merely dipping a thin steel strip 11 into a molten bath of the cupreous facing metal 12.

Although there are many methods by which a layer of bearing metal may be bonded to the layer of cupreous facing metal 12 of the strip 13 (Figure 2), one satisfactory method will be described hereinafter in connection with Figures 3 and 4 of the drawing. In Figure 3, a mold is shown generally at 20 completely prepared and ready to be poured. The mold 20 is prepared by conventional foundry practice. A flask bottom or drag 21 is first overturned on the foundry bench and an insert 22 of composite metal is placed therein and rests on the mold bench with its facing of cupreous metal downward. The drag is then filled in with sand, and after the proper amount of tamping the filled drag 21 is turned over on the foundry bench to a position as shown in Figure 3. A flask top or cope 23 is then located on the drag 21, and a pattern, equal in thickness to the bearing metal to be cast, is then located on the insert 22 of composite metal. The cope is then filled with sand, and after the proper amount of tamping thereof a sprue 24 and a vent 25 are formed. The filled cope 23 is now lifted off the drag 21 and turned bottomside up on the foundry bench. Before the pattern is lifted out, runner boxes 30 and 31 are cut along opposite sides of the pattern and connected with the sprue 24 as shown in Figure 4 of the drawing. Gates 32 are then formed from the runner boxes 30 and 31 leading to the pattern. The pattern is now removed to leave a mold space 33 in which the molten bearing metal is to be cast. The cope, having thus been prepared and the pattern lifted out to form the mold space 33, it is now replaced on the drag 21. Molten bearing metal may now be poured through the sprue 24 to fill the mold space 33 and bond to the cupreous metal facing of the insert 22. The runner boxes 30 and 31 and the gates 32 allow the molten bearing metal to be rapidly poured and to be uniformly distributed over the insert 22. Since the mold 20 is not preheated the molten bearing metal will solidify rapidly, and in those cases where there is a tendency for segregation it will be substantially prevented. This is very desirable in such cases where the bearing metal is a copper lead alloy in connection with which a slow cooling rate will allow segregation.

A section of three-layer composite bearing metal formed by the above described method is designated generally at 40 in Figure 5 of the drawing. The composite bearing metal 40 comprises a steel backing layer 11, an intermediate layer of cupreous facing metal 12, and a layer of bearing metal 41. The intermediate layer of cupreous facing or bonding metal 12 is of such thickness that it will not melt through when the molten bearing metal 41 is cast. Due to its dense wrought structure, iron migration from the steel 11 into the molten bearing metal 41 will be prevented thereby. The composite bearing metal 40 may be formed into the desired shape for bearing and bushings.

It will be understood that instead of having bearing metal 41 on one side only, a similar layer may be formed on the opposite side of the steel 11. If this is desired, the composite metal slab 10 of Figure 1 will have another layer of cupreous metal 12 formed on the opposite side thereof. The opposite layers of bearing metal 41 may be cast simultaneously or by separate operations.

It will be apparent that instead of using the method described in connection with Figures 3 and 4 of the drawing, the composite metal strip 13 of Figure 2 may be continuously pulled through a bath of molten bearing metal by any of the processes used for casting bearing metal on a steel strip only.

Although my invention is particularly useful in connection with plastic bronze bearing metals, such as copper-lead alloys, wherein segregation tends to occur and in which small percentages of iron are detrimental, other bearing metals, such as white bearing metal and babbitt, may be used. However, since the layer of cupreous facing or bonding metal 12 allows cupreous bearing metals to be readily bonded thereto at a much lower temperature and during a much shorter time than is required for bonding directly to steel, and since the cupreous facing metal 12 prevents migration of iron into the molten cupreous bearing metal, my invention is particularly useful therewith.

Since certain further adaptations and modifications of my invention may be adopted without departing from the scope thereof, I intend that it shall be limited only as indicated in the appended claims.

I claim as my invention:

1. Method of making a bearing which comprises, preheating a steel slab, casting a facing of cupreous metal upon the face of said slab, allowing the fused cupreous metal to remain fused upon said hot steel slab to produce a tenacious fusion bond, reducing the composite slab by rolling to bring the stock to gauge, said rolling serving to work the cast cupreous metal to a dense wrought structure, cutting the rolled stock to approximate size to form a bearing backing member, and casting a layer of molten anti-friction bearing metal of lower melting point than the cupreous facing thereupon, said molten bearing metal being cast at a temperature substantially in excess of its melting point upon the composite backing member in the cold condition, and said wrought layer of cupreous facing metal restraining iron migration from the steel backing into the anti-friction bearing metal, but forming a tenacious bond therewith.

2. Method of making a bearing which comprises, preheating a steel slab, casting a facing of cupreous metal on said steel slab and allowing the cupreous facing to bond by fusion to said slab to form a composite body of which the cupreous facing forms approximately 5% or more of the total thickness, rolling said composite body down to gauge and simultaneously working said cupreous facing into the form of a dense wrought layer of wrought cupreous metal, cutting the rolled stock to approximately the size of a bearing backing member, and casting molten bearing metal of copper-lead alloy at temperature substantially above its melting point upon the wrought cupreous face of said backing member while said member is cold, said bearing metal being bonded by fusion to said copper facing and constituting a cast layer of plastic antifriction metal substantially free of iron contamination from the steel backing.

3. A bearing comprising a strip of copper clad sheet steel consisting of a steel backing having a thin cupreous facing fusion bonded to the steel, said steel backing and cupreous facing having a wrought grain structure by virtue of being reduced by rolling after fusion bonding, and a relatively thick layer of plastic bearing metal fusion bonded to the cupreous facing by casting of the layer upon said facing, the facing having a fusion temperature below that of the steel backing and above that of the plastic bearing metal.

THOMAS B. CHACE.